United States Patent
Ng

(10) Patent No.: US 9,971,489 B2
(45) Date of Patent: May 15, 2018

(54) COMPUTER-BASED TRAINING USING A GRAPHICAL USER INTERFACE

(71) Applicant: DreamWorks Animation LLC, Glendale, CA (US)

(72) Inventor: Hoyt Lee Ng, Hayward, CA (US)

(73) Assignee: DreamWorks Animation L.L.C., Universal City, CA (US)

( * ) Notice: Subject to any disclaimer, the term of this patent is extended or adjusted under 35 U.S.C. 154(b) by 821 days.

(21) Appl. No.: 14/278,930

(22) Filed: May 15, 2014

(65) Prior Publication Data

US 2015/0331597 A1 Nov. 19, 2015

(51) Int. Cl.
| | |
|---|---|
| *G06F 3/0481* | (2013.01) |
| *G06F 3/0484* | (2013.01) |
| *G06T 13/80* | (2011.01) |
| *G09B 5/06* | (2006.01) |

(52) U.S. Cl.
CPC ...... *G06F 3/04847* (2013.01); *G06F 3/04817* (2013.01); *G06F 3/04842* (2013.01); *G06T 13/80* (2013.01); *G09B 5/065* (2013.01)

(58) Field of Classification Search
None
See application file for complete search history.

(56) References Cited

U.S. PATENT DOCUMENTS

| | | | |
|---|---|---|---|
| 6,288,753 B1 | 9/2001 | DeNicola et al. | |
| 6,317,142 B1 * | 11/2001 | Decoste | G06F 9/4443 |
| | | | 345/594 |
| 6,754,660 B1 * | 6/2004 | MacPhail | G06F 3/0482 |
| 6,976,228 B2 * | 12/2005 | Bernhardson | G06F 3/0482 |
| | | | 715/786 |
| 7,353,461 B2 * | 4/2008 | Davidsson | G06F 3/04886 |
| | | | 715/765 |
| 7,681,128 B2 * | 3/2010 | Yamamoto | G06F 3/0482 |
| | | | 715/716 |
| 8,270,815 B2 | 9/2012 | Yen et al. | |

(Continued)

FOREIGN PATENT DOCUMENTS

EP 2302495 A1 3/2011

OTHER PUBLICATIONS

Office Action received for European Patent Application No. 15167780.4, dated Jun. 22, 2016, 7 pages.

(Continued)

*Primary Examiner* — Phenuel Salomon
(74) *Attorney, Agent, or Firm* — Dentons US LLP

(57) ABSTRACT

A graphical user interface (GUI) for training includes, in some embodiments, a first group of icons arranged about a first axis, where the first group of icons corresponds to computer-generated animation concepts. The GUI also includes a second group of icons arranged about a second axis that intersects the first axis at a particular icon along the first axis. The second group of icons corresponds to videos that illustrate the computer-generated animation concept associated with the particular icon on the first axis. The GUI can also include a third group of icons arranged about a third axis that intersects the first axis at another icon along the first axis. Horizontal correspondence between icons along the second and third axes indicates logical relationships between the corresponding training content.

33 Claims, 13 Drawing Sheets

(56) References Cited

U.S. PATENT DOCUMENTS

| | | | |
|---|---|---|---|
| 2002/0075330 | A1 | 6/2002 | Rosenzweig et al. |
| 2004/0233239 | A1* | 11/2004 | Landesmaki ......... G06F 3/0482 |
| | | | 715/810 |
| 2005/0251755 | A1 | 11/2005 | Mullins et al. |
| 2005/0253854 | A1* | 11/2005 | Lischinski .............. G06T 13/60 |
| | | | 345/474 |
| 2005/0257166 | A1* | 11/2005 | Tu ......................... G06F 3/0485 |
| | | | 715/787 |
| 2007/0055947 | A1* | 3/2007 | Ostojic ................. G06T 3/0018 |
| | | | 715/800 |
| 2007/0160345 | A1 | 7/2007 | Sakai et al. |
| 2007/0171224 | A1* | 7/2007 | MacPherson ......... G06F 3/0481 |
| | | | 345/440 |
| 2008/0082581 | A1 | 4/2008 | Templier |
| 2008/0188954 | A1* | 8/2008 | Thomson ............. G05B 19/409 |
| | | | 700/17 |
| 2008/0250312 | A1 | 10/2008 | Curtis |
| 2008/0254419 | A1 | 10/2008 | Cohen |
| 2009/0019371 | A1* | 1/2009 | Audet .................... G06Q 10/10 |
| | | | 715/738 |
| 2009/0064222 | A1 | 3/2009 | Dawson et al. |
| 2010/0223157 | A1 | 9/2010 | Kalsi |
| 2011/0145764 | A1* | 6/2011 | Higuchi ................ G06F 3/0482 |
| | | | 715/835 |
| 2011/0181521 | A1 | 7/2011 | Reid et al. |
| 2012/0185800 | A1 | 7/2012 | Hart et al. |
| 2012/0284624 | A1 | 11/2012 | Ording |
| 2013/0239055 | A1 | 9/2013 | Ubillos |
| 2014/0047361 | A1* | 2/2014 | Gaspar ................... G06F 3/048 |
| | | | 715/762 |

OTHER PUBLICATIONS

Extended European search report received for European Patent Application no. 15167780.4, dated Oct. 2, 2015, 6 pages.

* cited by examiner

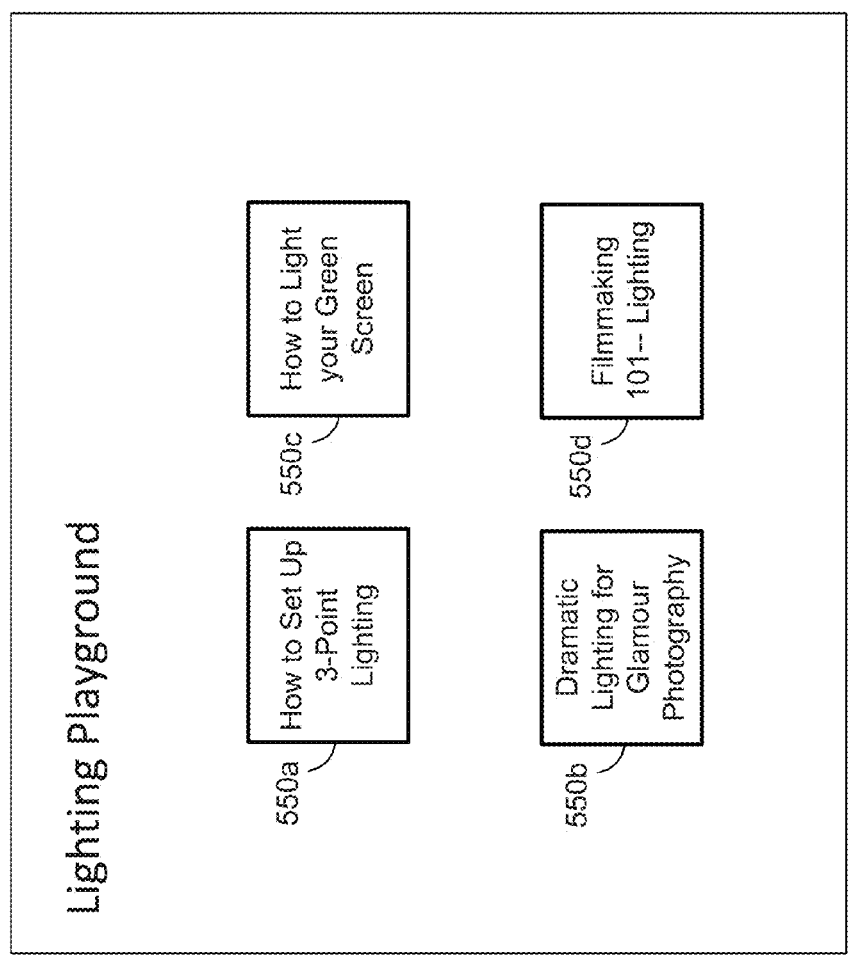

COMPUTER-BASED TRAINING USING A GRAPHICAL USER INTERFACE

BACKGROUND

1. Field

The present disclosure relates to user interfaces for training users, particularly computer-generated animation artists.

2. Description of Related Art

Existing user interfaces for navigating computer-based training content are not sufficiently effective. For example, conventional user interfaces may present training content in a list format and/or require a user to search a database of lessons based on keywords. The presentation of training material in these lists and/or databases may not be visually intuitive and can reduce usability. Furthermore, conventional user interfaces are often designed to access a single type of content, such as lessons, rather than a range of different types of content, such as lessons, examples, activities, and so forth. These conventional user interfaces thus fail to encourage user participation, which can reduce their effectiveness. A user-friendly and effective training graphical user interface (GUI) is desirable.

BRIEF SUMMARY

In some embodiments, a first plurality of icons arranged about a first axis is displayed on a screen. The first plurality of icons corresponds to a plurality of computer-generated animation concepts. First data representing a user selection of a first icon of the first plurality of icons is received, where the first icon correspond to a first computer-generated animation concept of the plurality of computer-generated animation concepts. In response, a tutorial teaching the first computer-generated animation concept is displayed. Further, a second plurality of icons arranged about a second axis is displayed on-screen. The second axis intersects the first axis at a given icon of the first plurality of icons. The second plurality of icons corresponds to a plurality of videos that illustrate the computer-generated animation concept corresponding to the first. The plurality of videos comprises portions from a plurality of computer-generated animation titles. Second data representing a user selection of a second icon of the second plurality of icons is received. In response to the received second data, a video of the plurality of videos corresponding to the first computer-generated animation concept is displayed.

In some embodiments, a third plurality of icons is also displayed on the screen, where the third plurality of icons arranged about a third axis. The third axis intersects the first axis at a third icon of the first plurality of icons. The third plurality of icons corresponds to a plurality of videos that illustrate the computer-generated animation concept corresponding to the third icon. In some embodiments, when an icon of the second plurality of icons is aligned on a horizontal axis with an icon of the third plurality of icons, then both icons are associated with portions from the same computer-generated animation title.

In some embodiments, a fourth plurality of icons arranged about the second axis is also displayed on the screen. The first axis separates the second plurality of icons and the fourth plurality of icons. The fourth plurality of icons corresponds to a plurality of instructor-narrated videos that teach the computer-generated animation concept corresponding to the first icon.

DESCRIPTION OF THE FIGURES

FIG. 5B depicts an exemplary playground component of a GUI for computer-generated animation training.

DETAILED DESCRIPTION

Figure 1:
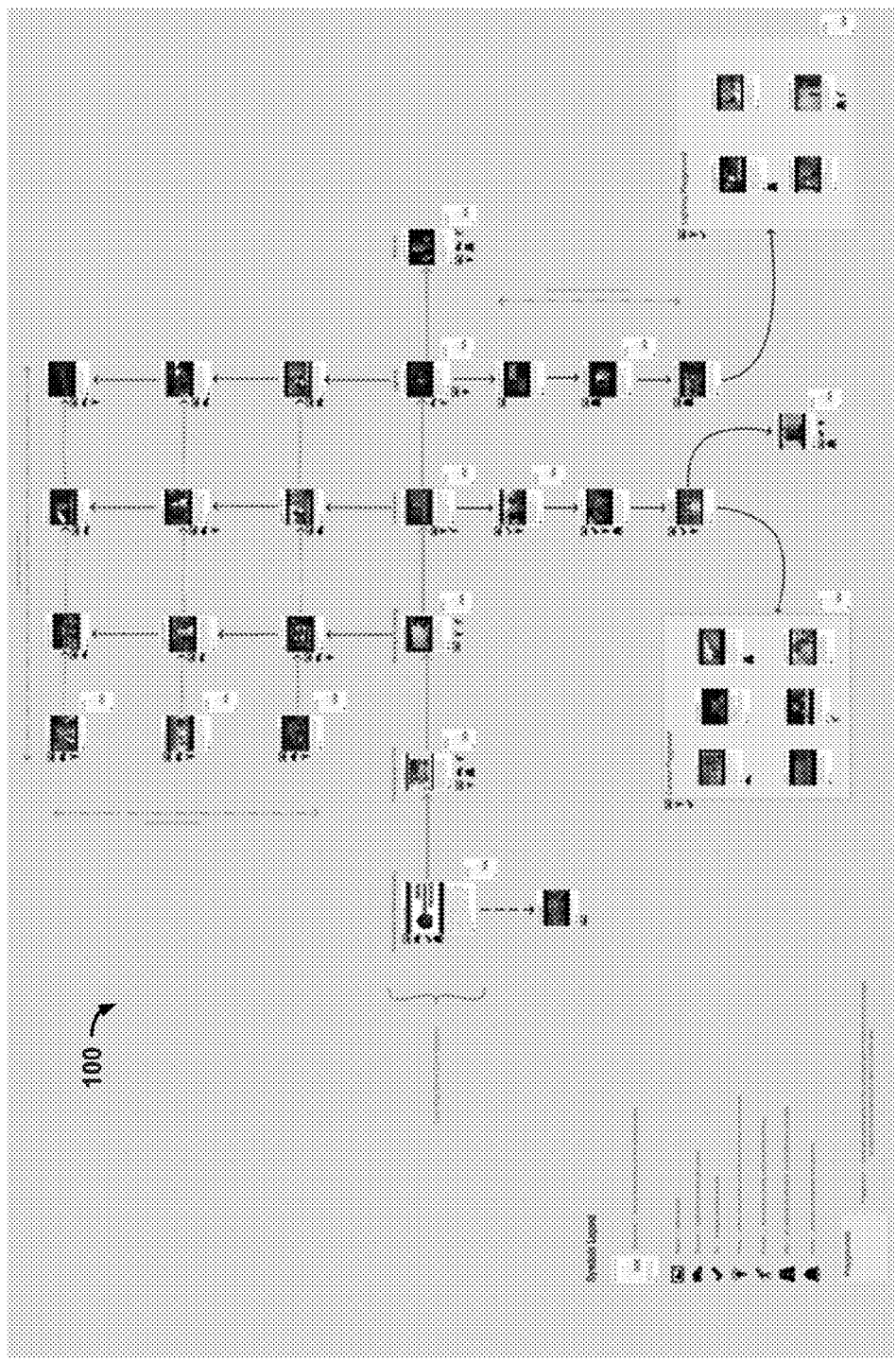
FIG. 1 depicts an exemplary GUI for computer-generated animation training.

FIG. 1 depicts an exemplary graphical user interface (GUI) 100 for training a user. In the illustrated embodiment, GUI 100 includes training content for teaching computer-generated animation concepts. A computer-generated animation artist (e.g., user) can interact with GUI elements in GUI 100 (such as icons and buttons) to access specific training features. Icons in GUI 100 are arranged in such a way that encourages and facilitates a user's progression through a training sequence. GUI 100 can be referred to as a "curriculum map." The features of GUI 100 are described in more detail with reference to FIGS. 2-4.

Figure 2:
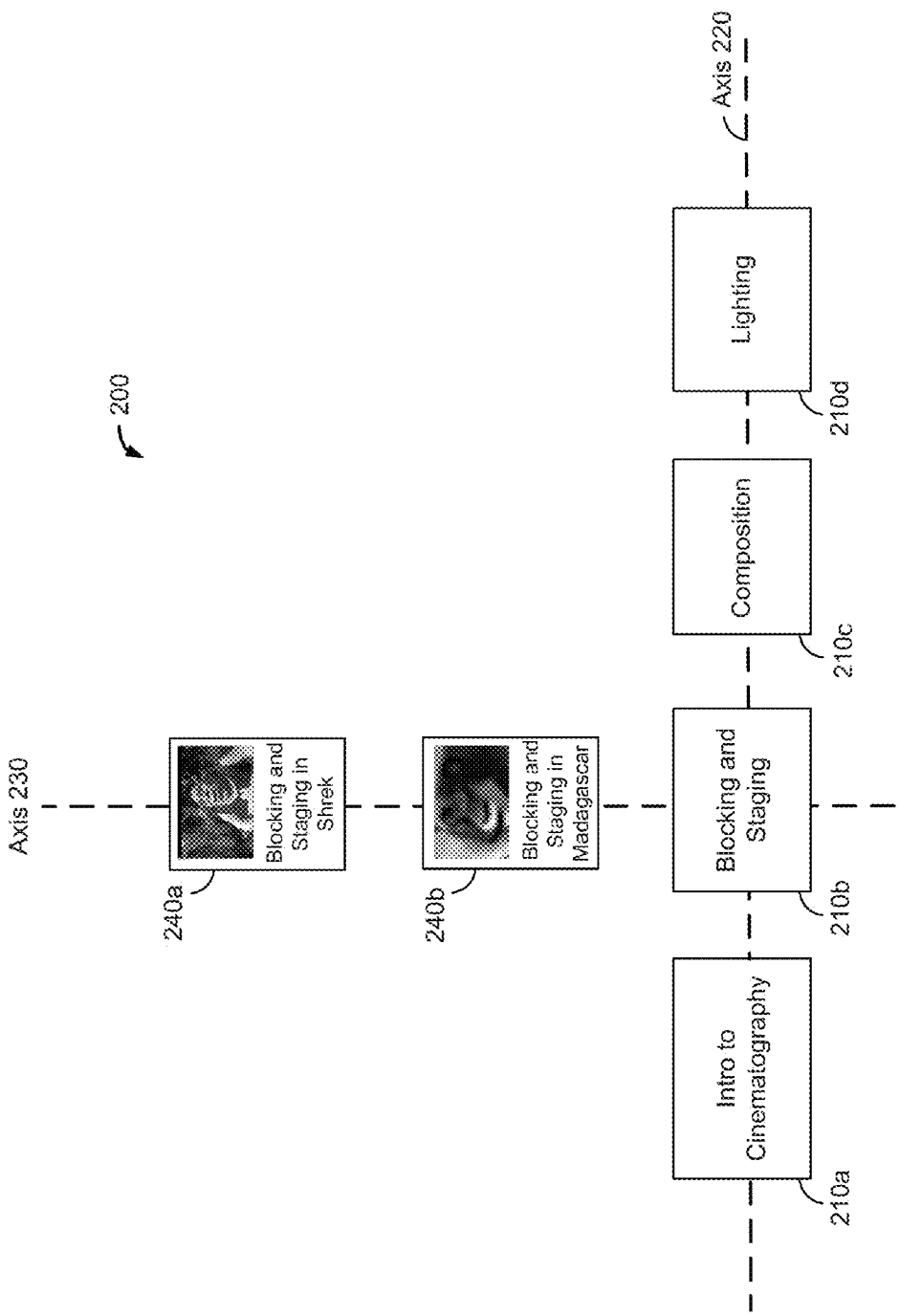
FIG. 2 depicts an exemplary GUI for computer-generated animation training.

FIG. 2 depicts GUI 200, which is a portion of GUI 100 (FIG. 1). GUI 200 includes icons 210a-210d arranged along axis 220. In the illustrated embodiment, axis 220 is horizontal; thus, icons 210a-210d are horizontally aligned on-screen. Note that axis 220 need not be visibly displayed. Icons 210a-210d each represents a concept in the art of computer-generated animation. For example, icon 210b represents a computer-generated animation concept called "blocking and staging," and is labeled as such. Likewise, icon 210d represents a computer-generated animation concept called "lighting," and is labeled as such. The ordering of icons 210a-210d along horizontal axis 220 corresponds to the order in which the associated concepts may be used to make a computer-generated animation title.

Icons 210a-210d are user-interactive, meaning that they respond to user input, for example, in the form of mouse, touch, and/or motion gesture input. For example, a user may click icon 210b to activate a tutorial module that teaches the corresponding concept of "blocking and staging." Exemplary tutorial modules include videos, text-based instructions, visual learning aids (such as a flowchart), and the like. A tutorial module may include instructor narration. This arrangement of user-interactive training content (i.e., icons 210a-210d) along axis 220 can be referred to as a "learning spine."

GUI 200 includes additional icons providing training functionalities. For instance, icons 240a and 240b are arranged along vertical axis 230 and are displayed above the learning spine (i.e., axis 220). Vertical axis 230 intersects the learning spine at icon 210b. Icons 240a and 240b provide access to illustrative examples of the computer-generated animation concept that is represented by icon 210*b* on the learning spine. Specifically, each of icons 240*a* and 240*b*, when activated, causes the display of a computer-generated animation video that implements and illustrates "blocking and staging" concepts. In other words, a user may touch icon 240*a* or 240*b* to display a video clip from a computer-generated animation title that was created using "blocking and staging." The video clip may also emphasize "blocking and staging" effects so that the user can appreciate the concept's usefulness in computer-generated animation. As illustrated, icons 240*a* and 240*b* correspond to clips (e.g., portions) from different computer-generated animation titles.

Note that in some embodiments, icons 240*a* and 240*b* are associated with clips of different portions (e.g., scenes) from the same computer-generated animation title. Further, note that axis 230 need not be visibly displayed on-screen. Still further, note that in some embodiments, icons 240*a* and 240*b* are displayed below the learning spine along axis 230.

Figure 3:
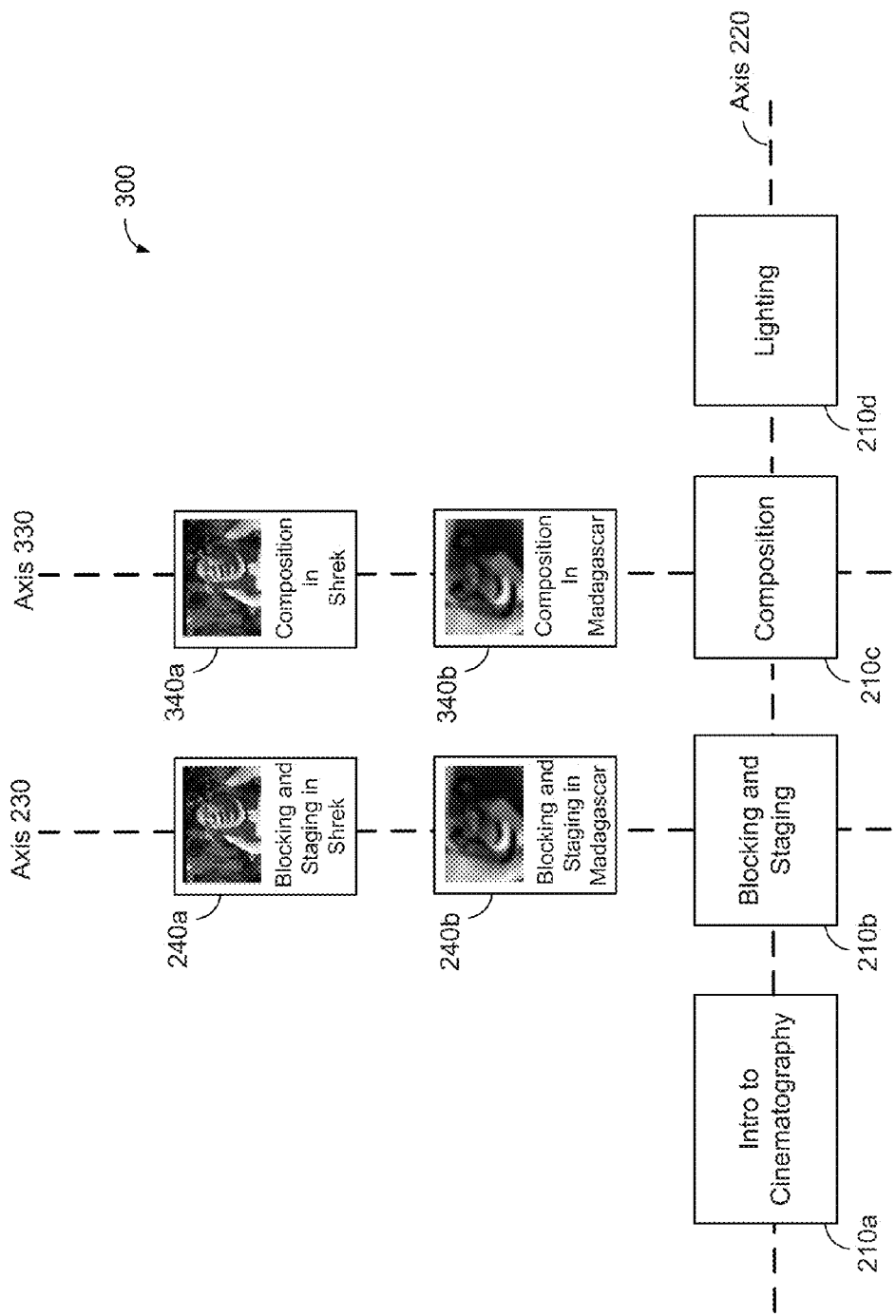
FIG. 3 depicts an exemplary GUI for computer-generated animation training.

FIG. 3 depicts exemplary GUI 300, which is also a portion of GUI 100 (FIG. 1). As compared with GUI 200 (FIG. 2), GUI 300 additionally includes icons 340*a* and 340*b* arranged along vertical axis 330. Vertical axis 330, which need not be visible, intersects the learning spine (horizontal axis 220) at icon 210*c*, which represents the computer-generated animation concept of "composition." Each of icons 340*a* and 340*b*, when activated, causes the display of an exemplary video clip illustrating "composition" concepts in computer-generated animation.

It can be seen from FIG. 3 that icons 240*a* and 340*a*, as well as icons 240*b* and 340*b*, are aligned along a horizontal axis (even though the horizontal axes themselves are not visibly drawn out). This alignment between the icon pairs denotes a notable relationship: icons 240*a* and 340*a* highlight different computer-generated animation concepts using video clips from the same computer-generated animation title. That is, a user may activate icon 240*a* to display a clip from a computer-generated animation title, such as assignee's Shrek™ title, that emphasizes "blocking and staging" concepts. Through a simple rightward horizontal navigation, the user may find and additionally activate icon 240*a* to display another clip—also from Shrek™—that emphasizes "composition" concepts. Icons 240*b* and 340*b* are similarly arranged.

The multi-axis arrangement of icons in GUI 100-300 beneficially permits user navigation through a curriculum map in a coherent manner. A user who is interested in learning about a concept of computer-generated animation using GUIs 100-300 (or more generally, a curriculum map) may begin by activating a concept icon (e.g., 210*a*-210*d*) to view a tutorial module on that concept. The user may then activate example icons (e.g., 240*a*-240*b* and/or 340*a*-340*b*) to view illustrative examples of the concept. The user may compare between implementations of a particular concept across different computer-generated animation titles—by navigating along one arrangement (e.g., vertical) of GUI elements. The user may also compare between the effects of different computer-generated animation concepts in identical computer-generated animation titles—by navigating along another arrangement (e.g., horizontal) of icons. These relationships, made clear by the visual layout of icons in GUIs 100-300, facilitate user navigation and progression through curriculum maps, thereby increasing the effectiveness of curriculum maps (e.g., GUIs 100-300) as training assets.

Figure 4:
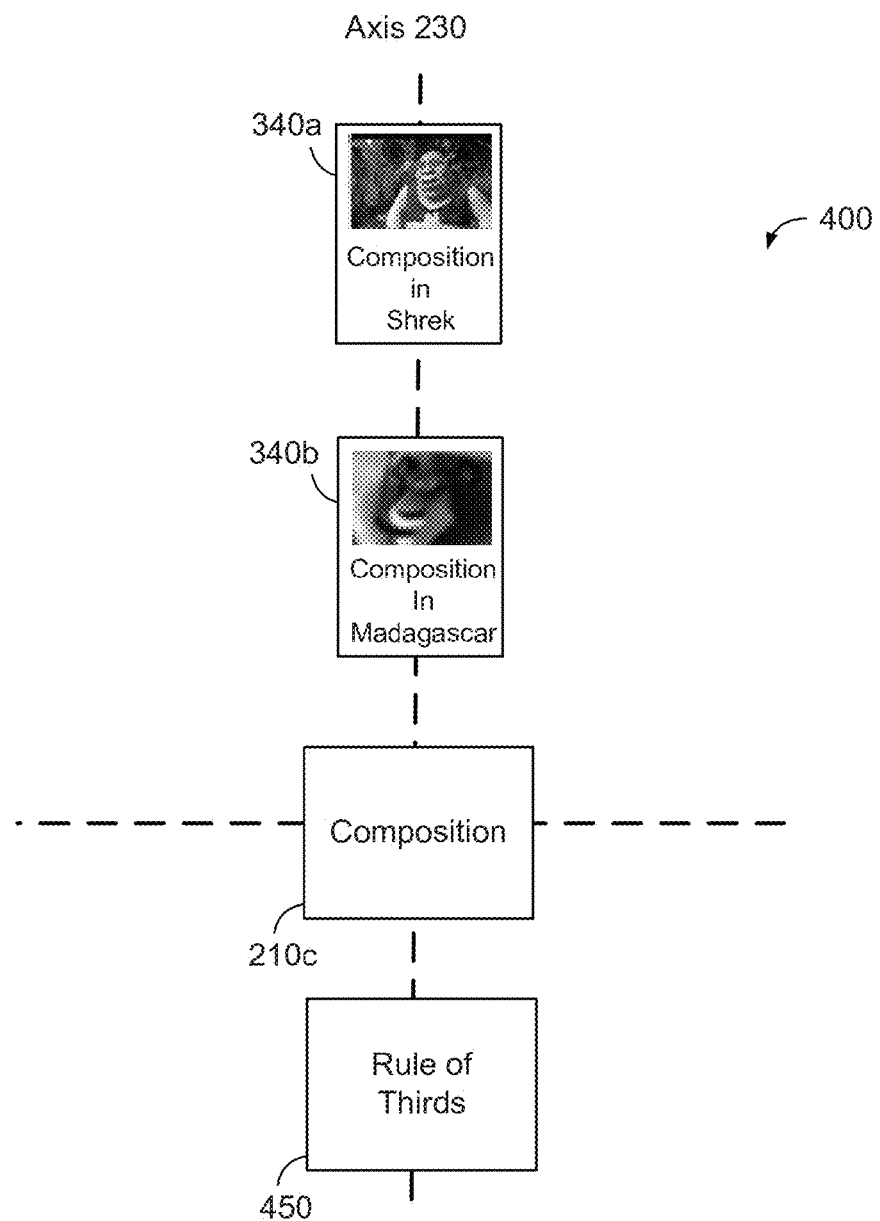
FIG. 4 depicts an exemplary GUI for computer-generated animation training.

FIG. 4 depicts exemplary GUI 400, which is also a portion of GUI 100 (FIG. 1). GUI 400 includes icon 450 which, like icons 340*a* and 340*b*, is arranged along vertical axis 230. Vertical axis 230 intersects the learning spine at icon 210*c*, which represents the "composition" concept. In the illustrated embodiment, icons appearing below the learning spine are associated with sub-concepts of a larger computer-generated animation concept. As depicted in FIG. 4, sub-concept icon 450 is associated with a lesson on a sub-concept, "rule of thirds," that is related to the overall concept of "composition." Sub-concept icons and their related lessons are useful for teaching broad or complex concepts as they permit larger concepts to be logically divided into more manageable chunks. Sub-concept icons are user interactive. For example, a user may activate sub-concept icon 450 to display a tutorial module that teaches the "rule of thirds" approach to composition. Note, although icon 450 is displayed below the learning spine in the illustrated embodiment, in some embodiments, the positioning of icons 340*a*-340*b* versus icon 350 with respect to the learning spine can be swapped.

In some embodiments, a GUI for training computer-generated animation concepts includes one or more playground areas for additionally exploring concepts on the learning spine. A playground is an area of a GUI containing icons associated with additional tutorial modules that a user may activate to explore a concept in more detail. Playgrounds are described in more detail with respect to FIGS. 5A and 5B.

Figure 5A:
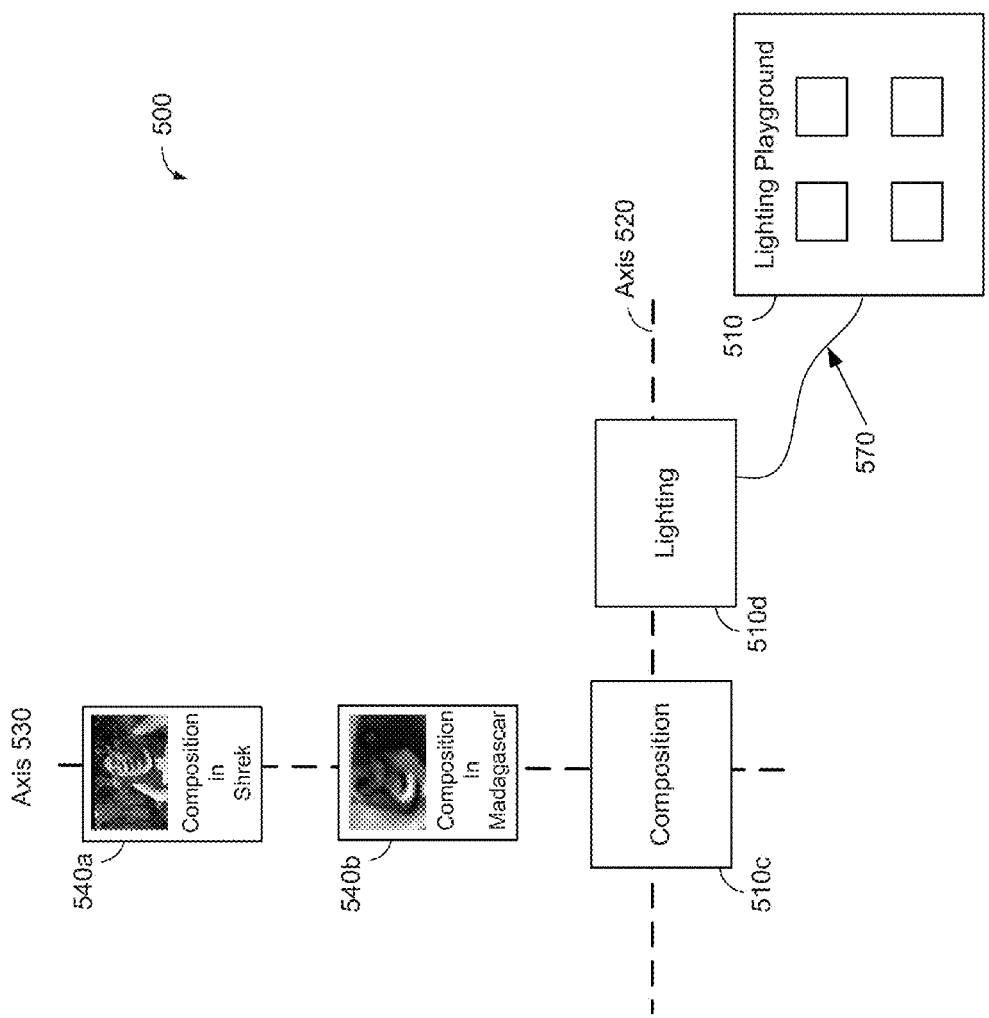
FIG. 5A depicts an exemplary GUI for computer-generated animation training.

FIG. 5A depicts exemplary GUI 500 having exemplary playground 510. Playground 510 permits further exploration of the computer-generated animation concept—lighting—associated with icon 510*d* on learning spine 520. In the illustrated embodiment, playground 510 is visually connected with concept icon 510*d* via visible connecting line 570, which may be optional in other embodiments. Also, in the illustrated embodiment, playground 510 is visually emphasized within GUI 500 using a visible bounding box, which may be optional in other embodiments. Optionally, playground 510 may be visually indicated in GUI 500 by using a different background color and/or a different font.

FIG. 5B depicts additional details of playground 510. Playground 510 has icons 550*a*-550*d*. Each of playground icons 550*a*-550*d* is associated with a tutorial module (such as a training video) on an aspect of lighting, such as "how to set up 3-point lighting" represented by playground icon 550*a*. Playground icons are user interactive, that is, a user may activate a playground icon to view its associated tutorial module.

In some embodiments, a curriculum map can provide information that suggests, to the user, a sequence of access to tutorial material, such as a navigation path through the curriculum map. Such information may include visual cues, such as arrows depicting a path from one icon to another.

Figure 6:
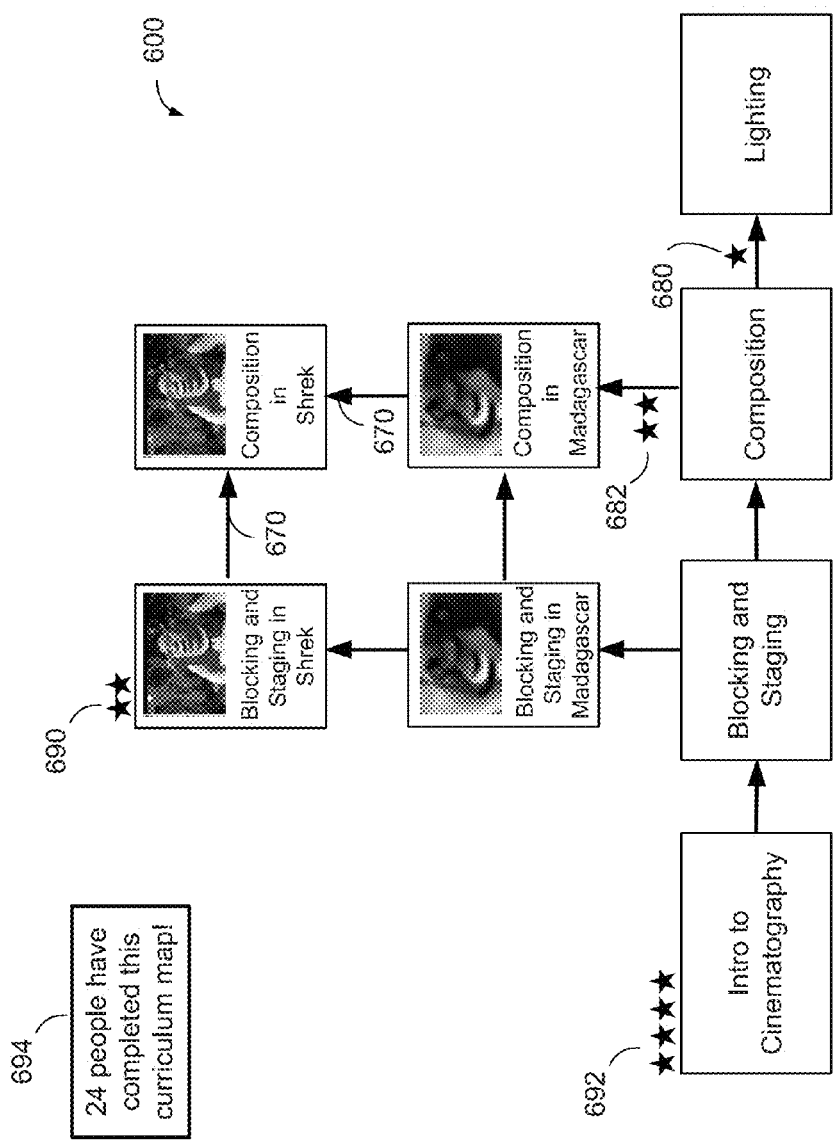
FIG. 6 depicts an exemplary GUI for computer-generated animation training.

FIG. 6 depicts GUI 600 having several types of information suggesting potential paths through the curriculum map. Exemplary arrows 670 indicate possible paths through the training content offered by GUI 600. Optionally, this directionality may be enforced, meaning that icons must be activated in the order indicated by the arrows. When directionality is not enforced, icons may be activated in any order; thus, although the user is provided with guidance for navigating GUI 600, the user may instead access the content in an order based on personal interest or specific learning objectives.

In addition, a curriculum map can provide social information based on how other users have navigated the curriculum map. For example, GUI 600 depicts path popularity indicators 680 and 682 that depict the relative popularity of different paths leading away from an icon. Path popularity indicator 680 provides a visual indication of the number of users who, after accessing the Composition tutorial module, then accessed the Lighting module. Path popularity indicator 682 provides a visual indication of the number of users who, after accessing the Composition tutorial module, then accessed the Composition in Madagascar module. The path popularity indicators can help users of the curriculum map decide which path to take. In this example, the path popularity indicators are stars that represent the number of users who have traversed a particular path. In other examples, the path popularity indicators may have other visual appearances, such as numerical text indicating the actual number of users who have traversed a given path, or a numerical text indicating a rating score or percentage, or some other visual cue.

GUI 600 also includes content quality indicators that provide an indication of the quality of each content module. Content quality indicator 690 depicts the quality of the content associated with Blocking and Staging in Shrek, while content quality indicator 692 depicts the quality of the content associated with Intro to Cinematography. In this example, content quality indicators 690 and 692 are represented by stars; in other examples, the content quality indicator may be a number, or a graphic, or some other type of indicator. The content quality indicators can help users of the curriculum map decide which training content to view or choose a path through the curriculum map.

GUI 600 also includes social indicator 694, which provides an indication of how many users have completed the curriculum map. In some examples, GUI 600 may provide indicators of the complete paths taken by other users, or the current location of other users on the curriculum map (e.g., which tutorial modules users are currently viewing or last viewed), or other social indicators that reflect aggregated or individual user activities.

Figure 7:
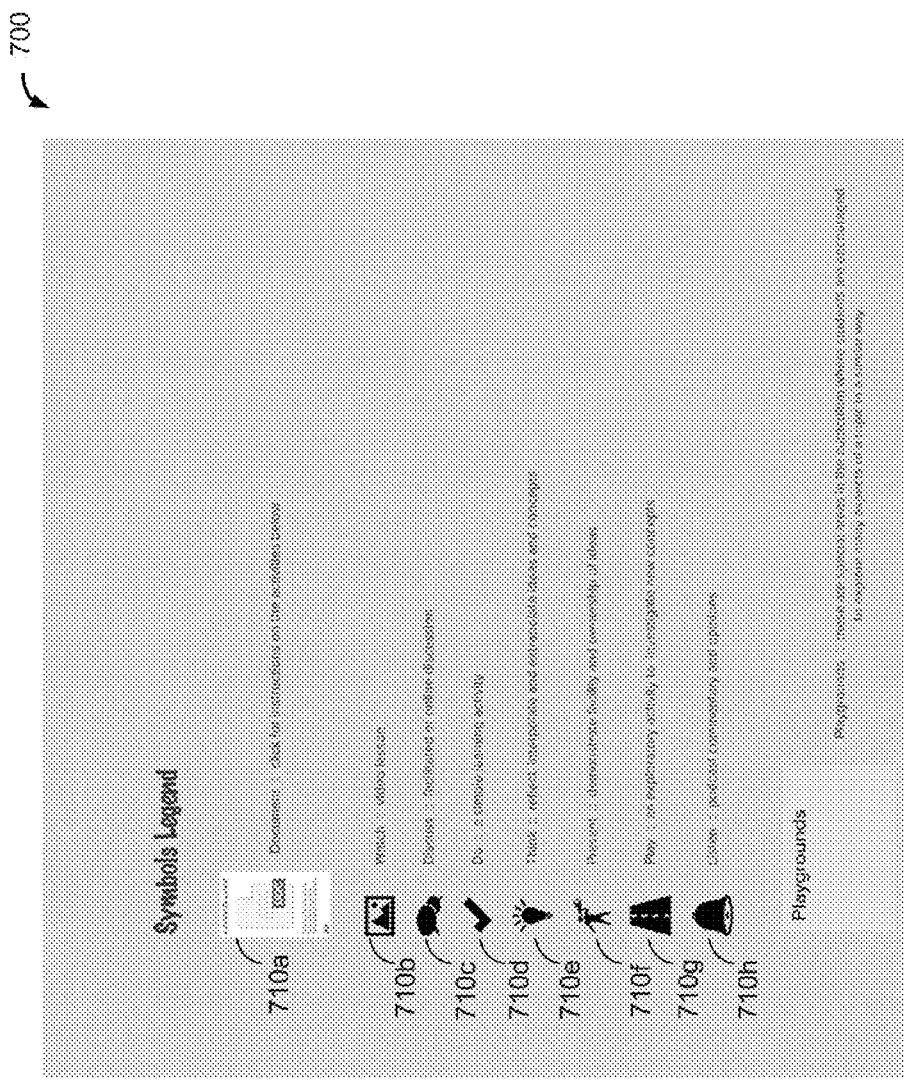
FIG. 7 depicts a legend for activity icons.

In some embodiments, an icon in a curriculum map can have one or more activity icons arranged adjacent to it. In some embodiments, two icons are adjacent if the distance between the icons is less than the maximum width of the larger icon and there are no intervening icons between the two icons. In some embodiments, two icons are adjacent if the distance between the icons is less than half the maximum width of the larger icon and there are no intervening icons between the two icons. Activity icons are user-interactive and represent activities for the user to engage in. Such activities may include discussion forums, learning activities, or podcasts, and so forth. FIG. 7 depicts exemplary activity icons 710*a-h*. These icons include a "document" icon 710*a* that can be activated to display text instructions for one or more activities; a "watch" icon 710*b* that can be activated to display a video lesson; a "discuss" icon 710*c* that can be activated to display an online discussion group or forum; a "do" icon 710*d* that can be activated to display a learning activity (such as a quiz or exercise, for example); a think icon 710*e* that can be activated to display instructions that suggest topics for the user to think about; a present icon 710*f* that can be activated to display instructions for the user to create and/or deliver a presentation on a specified topic; a play icon 710*g* that can be activated to display instructions for engaging in a particular learning activity (such as conducting a particular experiment, or observing a physical phenomenon such as light reflected through a glass of water); and a listen icon 710*h* that can be activated to playback to an audio recording such as podcast commentary or opinions. In some embodiments, activity icons may also be arranged adjacent to playground areas, thereby providing the user with opportunities to access activities associated with lessons taught in the playground.

Figure 8:
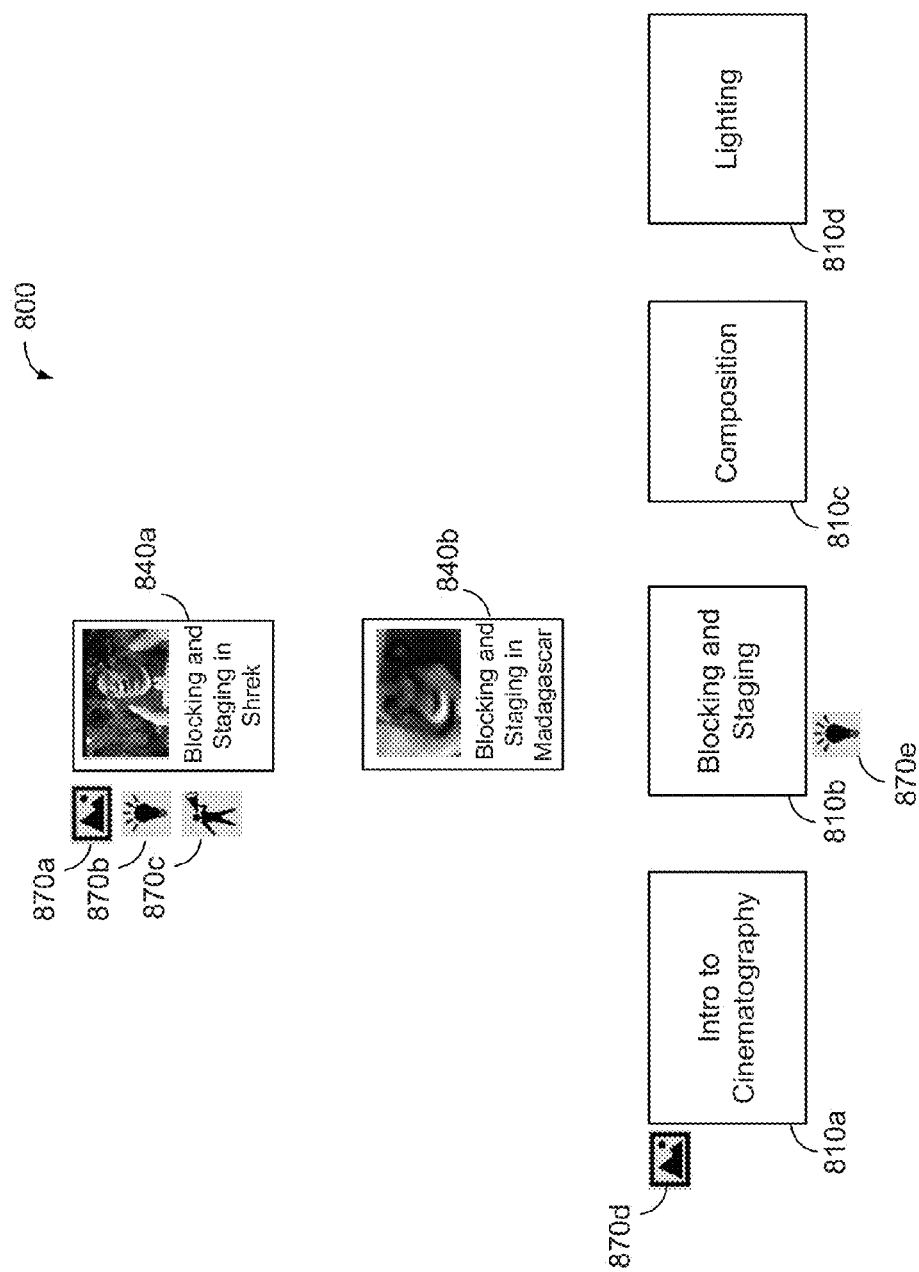
FIG. 8 depicts an exemplary GUI for computer-generated animation training.

FIG. 8 depicts exemplary GUI 800 having multiple activity icons 870*a*-870*e* that are arranged adjacent to concept icons 810*a*-810*b* and example icon 840*a*. As shown in FIG. 8, concept icon 810*a* has an activity icon 870*d* adjacent to it. Activity icon 870*d*, when activated, causes GUI 800 to display a video lesson related to "intro to cinematography." Concept icon 810*b* has an activity icon 870*e* adjacent to it. Activity icon 870*e*, when activated, causes GUI 800 to display instructions that suggest topics related to blocking and staging for the user to think about. In addition, example icon 840*a*, labeled "blocking and staging in Shrek," has three adjacent activity icons 870*a*-870*c*. Each of these three activity icons 870*a*-870*c* allows the user to access an activity that is related to blocking and staging in Shrek. Icon 870*a* causes GUI 800 to display a video lesson related to blocking and staging in Shrek; icon 870*b* causes GUI 800 that suggest topics for the user to think about blocking and staging in Shrek; and icon 870*c* causes GUI 800 to display instructions for the user to create and/or deliver a presentation on a topic related to blocking and staging in Shrek.

It should be noted that the number and assignment of activity icons to concept icons, sub-concept icons, example icons, and playgrounds can vary. Furthermore, the activity icons may be arranged adjacent to any side of an icon or playground. For example, an activity icon may be above, below, to the left, or to the right of an icon or playground.

Figure 9:
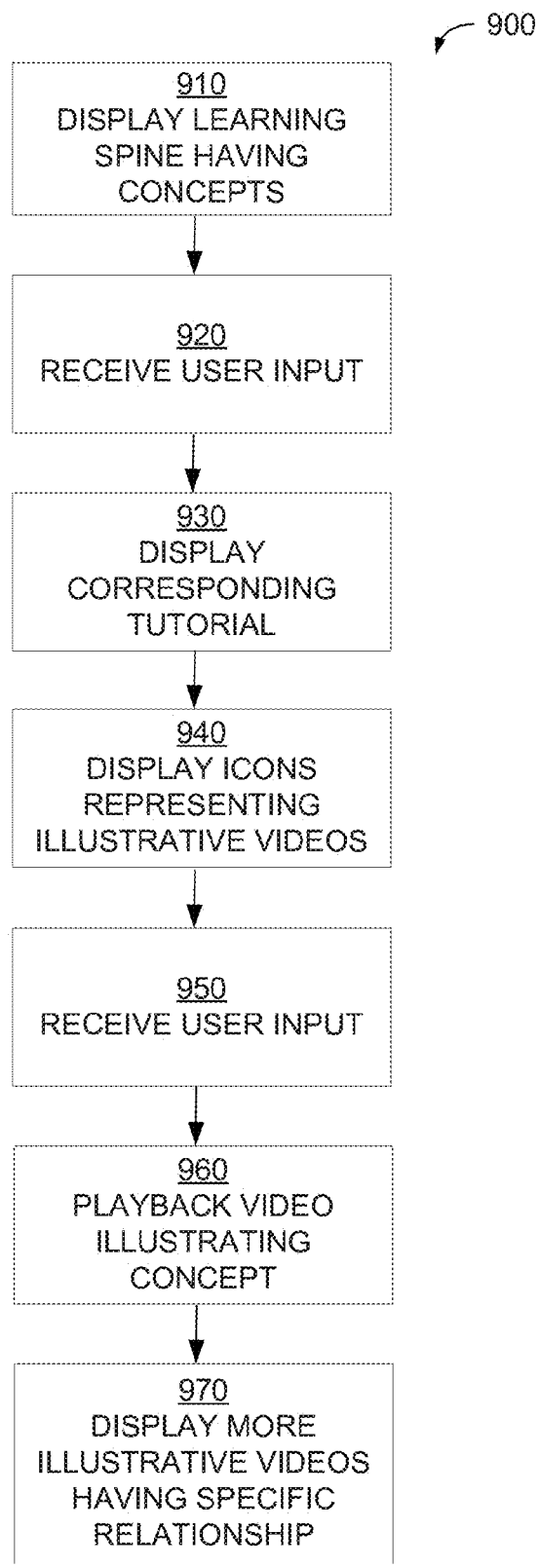
FIG. 9 depicts an exemplary process for computer-generated animation training.

FIG. 9 illustrates exemplary process 900 which may be performed by a computer system to perform the above-described techniques, including the display of GUIs 100-800.

At block 910, a first plurality of icons is displayed. The plurality of icons may represent a set of tutorial modules that teach specific concepts, and may be displayed as shown and described with respect to GUIs 100-800. For example, the first plurality of icons may be displayed on-screen along a horizontal axis, e.g., a learning spine.

At block 920, data representing a user selection of an icon in the first plurality of icons is received. The icon may be selected by a user by touching a touchscreen or by using a mouse, for example. As discussed above, icons of the learning spine correspond to various concepts. Thus, in some embodiments, the selected icon corresponds to a concept in computer-generated animation. At block 930, a tutorial module that teaches the concept is displayed in response to receiving the data at block 920.

At block 940, a second plurality of icons is displayed. The second plurality of icons may correspond to a set of example videos that provide illustrative examples of a concept associated with one of the icons in the first plurality of icons. The second plurality of icons may be displayed based on the relationships as shown and described with respect to GUIs 100-800. For example, the second plurality of icons may be displayed along a vertical axis centered on the concept tutorial module to which the plurality of icons is related. It should be the noted that the display of the second plurality of icons at block 940 need not be based on the user selection made during block 920. Restated, the second plurality of icons can be displayed before and/or after data representing a user selection of an icon in the first plurality of icons is received.

At block 950, data representing a user selection of an icon in the second plurality of icons is received. As discussed above, these icons may correspond to tutorial modules illustrating a particular concept of the learning spine. At block 960, a tutorial module, such as a video clip, is displayed in response to receiving the data at block 950.

At block 970, a third plurality of icons is displayed. The third plurality of icons may correspond to a set of example videos that provide illustrative examples of a concept associated with another (e.g., a second) icon on the learning spine. The third plurality of icons may be displayed based on the relationships as shown and described with respect to GUIs 100-800. For example, the third plurality of icons may be displayed along a vertical axis centered on the concept icon (on the learning spine) to which the plurality of icons is related. It should be the noted that the display of the third plurality of icons at block 970 need not be based on the user selection(s) made during block 920 nor block 940. Restated, the second plurality of icons can be displayed independent of user's interaction with the curriculum map.

Figure 10:
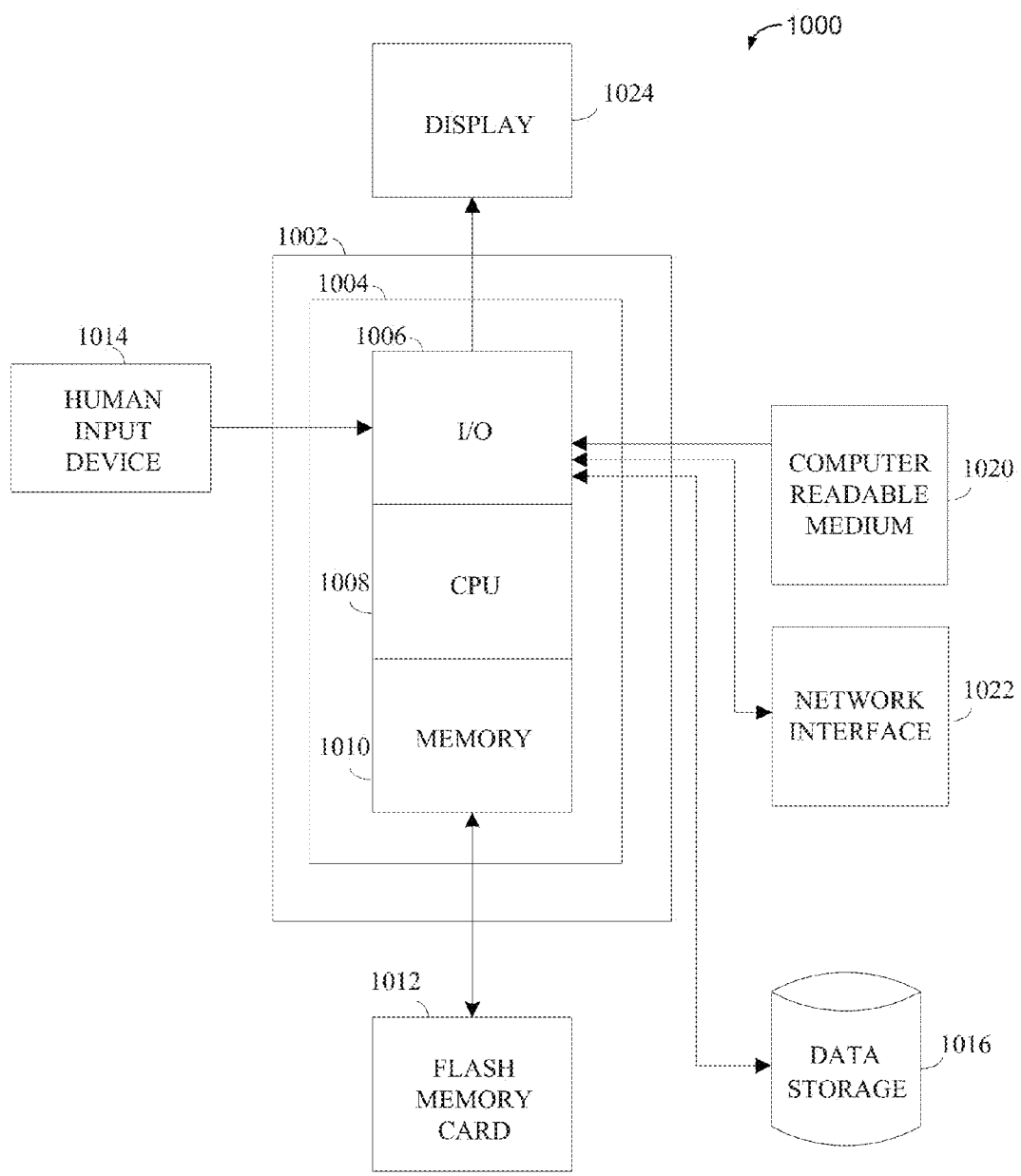
FIG. 10 depicts an exemplary computing system for computer-generated animation training.

FIG. 10 depicts computing system 1000 that may be suitable for performing the above-described techniques and processes. Computing system 1000 may be suitable for providing training in computer-generated animation because it is capable of supporting computer-generated animation development environments. Computing system 1000 may also be suitable because it has a form factor well-suited for classroom use, such as a portable computer with touchscreen and multimedia capabilities. Exemplary computing system 1000 includes a motherboard 1002 having I/O section 1006, one or more central processing units ("CPU") 1008, and memory section 1010. Memory section 1010 may be based on various memory modules, such as DIMM memory modules. Memory section 1010 also may be operatively coupled, directly or indirectly through I/O section 1006, with other memory modules, such as flash memory card 1012, a USB memory stick, and the like. I/O section 1006 is operatively coupled with display 1024, human interface device 1014, network interface 1022, and data storage unit 1016. Human interface device 1014 may be a keyboard, a mouse, a touch-sensitive sensor, a motion sensing device, and the like. Display 1024 and human interface device 1014 may be combined to form a touchscreen. Data storage unit 1016 may be a disk drive, solid-state storage device, Internet-based (e.g., cloud) storage, and the like.

Computing system 1000 may have computer-executable instructions for performing the above-described techniques, including process 900 (FIG. 9), to display GUIs 100-800. Such computer-executable instructions may be stored in memory section 1010. Memory section 1010 may obtain the computer-executable instructions from a local memory module such as flash memory card 1012. Memory section 1010 may also obtain the necessary computer-executable instructions via I/O section 1006 and its peripherals. For example, it may obtain the computer-executable instructions via network interface 1022 from a network source (such as an organization's intranet or the Internet). Memory section 1010 may also obtain the computer-executable instructions via data storage unit 1016. Data storage unit 1016 may itself be, or may be a device configured to read from, a non-transitory computer-readable medium 1020 that is used to store (e.g., tangibly embody) one or more computer programs for performing the above-described techniques and processes. The computer program may be written using technologies such as C, Java, JavaScript, HTML5, Python, PHP, MySQL, Android™ software toolkit ("STK"), and/or iOS™ software development toolkit.

In some embodiments, memory section 1010 and/or data storage unit 1016 may store state information that identifies a user's progress through a curriculum map. The state information may include whether a user has accessed particular training feature, such as tutorials, exemplary videos, playgrounds, and so forth. Such state information may also include information the sequence in which a user has accessed particular training features. Such state information may also include information about how long a user has spent on each feature and which feature was most recently accessed. In these embodiments, computing system 1000 may use state information to enforce a sequence of content accesses, meaning that a user may be restricted from activating a particular icon on the learning spine until a specific previous icon(s) and/or playground(s) has been activated. Computing system 1000 may also use state information to allow a user to resume where they left off, or to track a user's progress through the GUI, for example. A user may track their own progress in a curriculum map. An administrator and/or instructor may also track a user's progress in a curriculum map.

As previously mentioned, the example training GUIs described above are directed to teaching concepts in computer-generated animation, particularly those used in the making of computer-generated animation titles. For purposes of this disclosure, a computer-generated film that is shown in theaters and/or sold via media (e.g., Blu-Ray, cloud, e-delivery, etc.) constitutes a computer-generated animation title. A film in which human actors and/or scenes are digitally enhanced using computer-generated elements is not considered to be computer-generated animation titles. These techniques and processes underlying these examples, however, need not be limited to applications in computer-generated animation.

Figure 11:
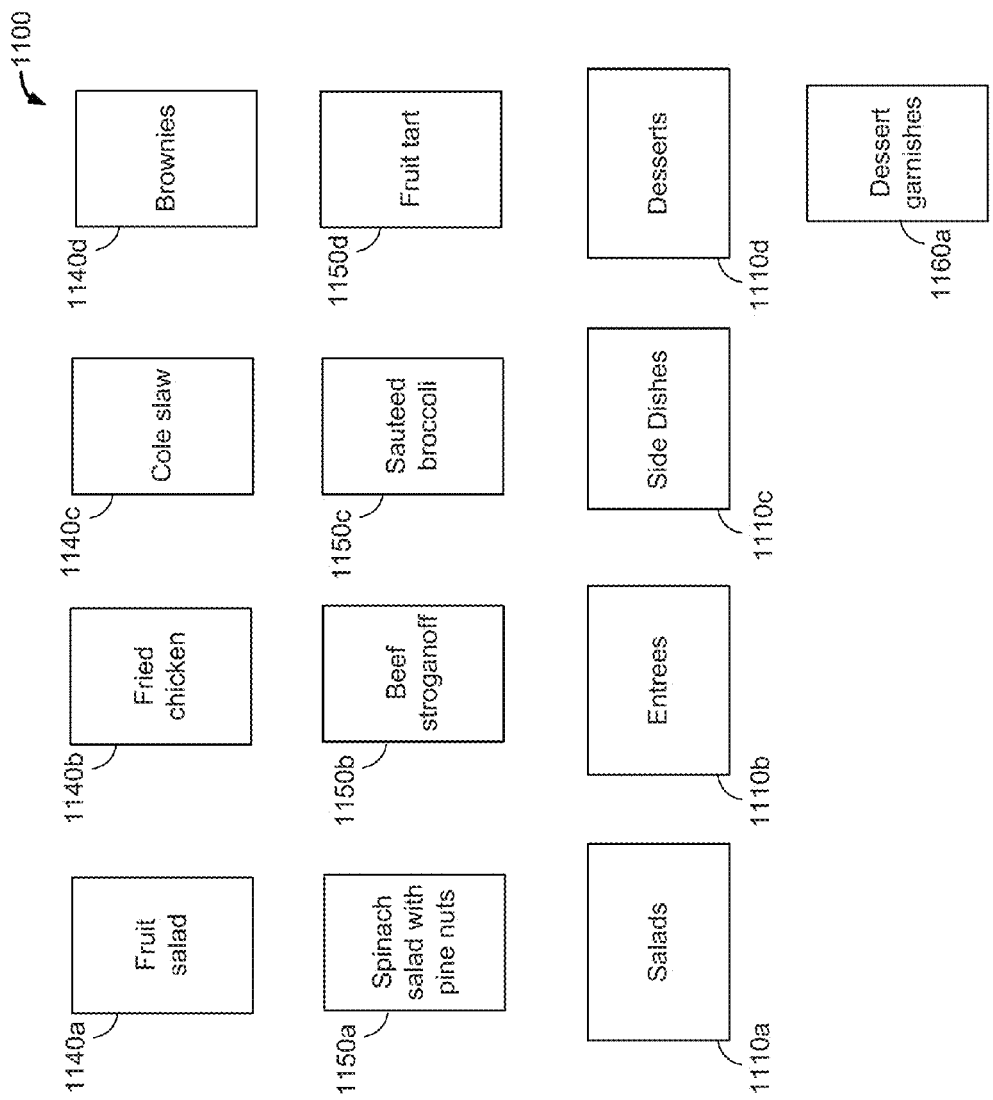
FIG. 11 depicts an exemplary GUI for meal preparation training.

Indeed, curriculum maps may be directed to topics other than computer-generated animation titles. It should be appreciated that curriculum maps can be extended to cover a wide range of subject matter. As one example, embodiments of the curriculum map can be directed to teaching meal preparation, as depicted in FIG. 11. In the embodiment of FIG. 11, the learning spine has concept icons 1110a-1110d related to types of dishes that may be part of a meal, including "salads," "entrees," "side dishes," and "desserts." These concept icons may be associated with tutorial content that describes the type of dish, discusses seasonal, geographical, or occasion-based considerations, or teaches other aspects related to the concepts (dishes) on the learning spine. The ordering of the concept icons along the learning spine corresponds to the order in which these dishes would typically be served during a meal.

Example icons 1140a-1140d, 1150a-1150d, arranged above the learning spine, provide examples of the types of dish (salads, entrees, side dishes, and desserts) as implemented in different meals. For example, a user wishing to view examples of entrees could activate icons 1140b and 1150b. These examples may be exemplary pictures of the dish, an exemplary recipe for the dish, or exemplary instructions describing how to make the dish, for example. A user wishing to view examples of an entire meal could view horizontally adjacent example icons 1140a-d or 1150a-d, thus viewing examples of a salad, an entrée, a side dish, and a dessert all taken from a single meal. Example icons 1140a-1140d correspond to a casual picnic lunch, while example icons 1150a-1150d correspond to a more formal dinner. Icons arranged below the learning spine may be associated with sub-concepts such as common preparation techniques and serving considerations for each concept. For example, sub-concept icon 1160A is associated with dessert garnishes, a sub-concept of the concept of dessert. A student chef would thus be able to navigate through GUI 1100 to grasp concepts in meal selection and preparation, review specific example dishes in each category, review meals comprised of multiple dishes, and view additional sub-concept tutorials related to a concept (such as dessert garnishes) as needed.

Furthermore, it should be appreciated that the visual layout of curriculum maps may vary between embodiments. For example, the locations of icons associated with illustrative examples and sub-concept icons may be swapped such that the icons associated with illustrative examples appear below the learning spine and the sub-concept icons appear above the learning spine. In some embodiments, the learning spine may be arranged vertically. Also, although the axes are depicted as being orthogonal in the exemplary GUIs, this is not required in all embodiments. The axes may be slanted in some embodiments, for example.

Figure 12:
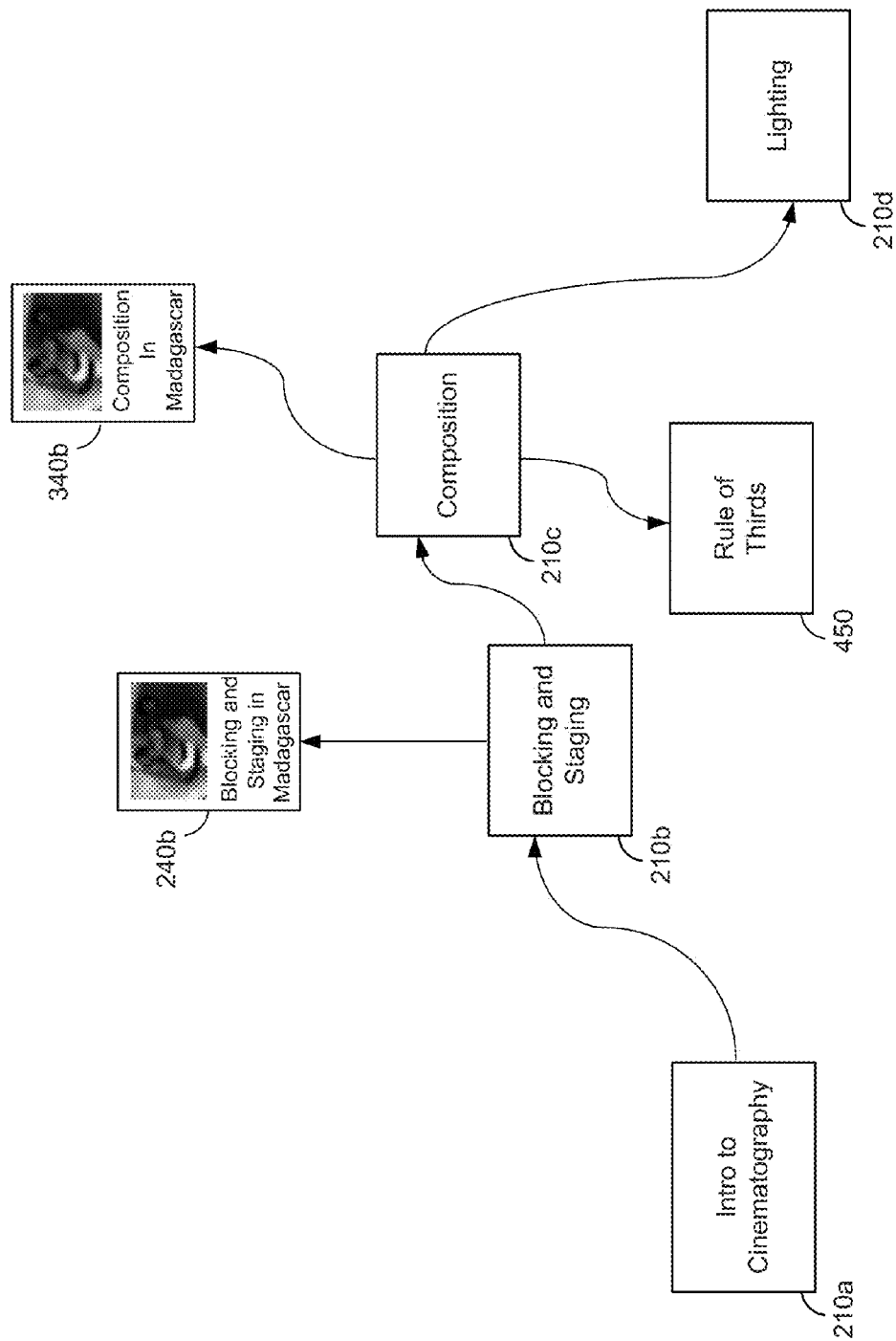
FIG. 12 depicts an exemplary GUI for computer-generated animation training.

In some embodiments, icons that constitute a learning spine need not be arranged along a linear axis. FIG. 12 illustrates an exemplary non-linear curriculum map. As shown, concept icons (210a-d) are not arranged along linear axes above or below concept icons, but are instead arranged along a curve. In some embodiments, example icons and sub-concept icons that are associated with a non-linear curriculum map need not be arranged along linear axes above and below the concept icons. Example icons and sub-concept icons (such as example icons 240b and 340b and sub-concept icon 450) need not be directly above or below the concept icons. In this case, the curriculum map provides visual indicators (such as arrows) to enable the user to follow the learning spine and determine which example icons and sub-concept icons are related to which concept icons.

In some embodiments, the background of the curriculum map may include graphical elements. Such graphical elements may provide additional visual cues to the user about the curriculum map. For example, the background may depict a traditional landscape map (i.e., a diagrammatic representation of an area of land or sea showing physical features, cities, roads, etc.) that provides some indication of the level of effort required to traverse a particular path through the map. In this example, a concept icon may be depicted as lying at the top of a mountain if it lies on a particularly challenging path through the curriculum map. Similarly, a concept icon may be shown on the background map as being remote from populated areas (in a desert, for example) if the concept is relatively obscure.

Although only certain examples have been described in detail above, those skilled in the art will readily appreciate that many modifications are possible without materially departing from the novel teachings and advantages of this disclosure. For example, aspects of embodiments disclosed above can be combined in other combinations to form additional embodiments. Accordingly, all such modifications are intended to be included within the scope of this disclosure.

What is claimed is:

1. A non-transitory computer-readable storage medium having computer-executable instructions, wherein the computer-executable instructions, when executed by one or more processors, cause the one or more processors to display a graphical user interface for training computer-generated animation concepts, the computer-executable instructions comprising instructions for:
displaying, on a screen, a first plurality of icons arranged about a first axis, the first plurality of icons corresponding to a plurality of computer-generated animation concepts;
receiving first data representing a user selection of a first icon of the first plurality of icons, the first icon corresponding to a first computer-generated animation concept of the plurality of computer-generated animation concepts, and in response to the received first data, displaying on the screen a tutorial teaching the first computer-generated animation concept;
displaying, on the screen, a second plurality of icons arranged about a second axis,
wherein the second axis intersects the first axis at the first icon of the first plurality of icons,
wherein the second plurality of icons corresponds to a plurality of videos that illustrate the computer-generated animation concept corresponding to the first icon, and
wherein the plurality of videos comprises portions from a plurality of computer-generated animation titles, and
wherein each icon of the second plurality of icons corresponds to a different computer-generated animation title of the plurality of computer-generated animation titles; and
receiving second data representing a user selection of a second icon of the second plurality of icons, and in response to the received second data, displaying on the screen a video of the plurality of videos, the video corresponding to the first computer-generated animation concept.

2. The non-transitory computer-readable storage medium of claim 1, wherein the computer-executable instructions comprise instructions for:
displaying, on the screen, a third plurality of icons arranged about a third axis,
wherein the third axis intersects the first axis at a third icon of the first plurality of icons, and
wherein the third plurality of icons corresponds to a plurality of videos that illustrate the computer-generated animation concept corresponding to the third icon.

3. The non-transitory computer-readable storage medium of claim 2, wherein:
when an icon of the second plurality of icons is aligned on a horizontal axis with an icon of the third plurality of icons, then both icons are associated with portions from the same computer-generated animation title.

4. The non-transitory computer-readable storage medium of claim 3, wherein the computer-executable instructions comprise instructions for:
receiving third data representing user selection of the first icon; and
in response to the received third data, displaying an instructor-narrated video that teaches a corresponding computer-generated animation concept.

5. The non-transitory computer-readable storage medium of claim 4, wherein the first axis and the second axis are orthogonal.

6. The non-transitory computer-readable storage medium of claim 5, wherein the first axis is horizontal and the second axis is vertical.

7. The non-transitory computer-readable storage medium of claim 3, wherein the computer-executable instructions comprise instructions for:
displaying, on the screen, a fourth plurality of icons arranged about the second axis,
wherein the first axis separates the second plurality of icons and the fourth plurality of icons, and wherein the fourth plurality of icons corresponds to a plurality of instructor-narrated videos that teach the computer-generated animation concept corresponding to the first icon.

8. The non-transitory computer-readable storage medium of claim 7, wherein:
each icon in the fourth plurality of icons comprises an instructor-narrated video that teaches an aspect of the computer-generated animation concept corresponding to the first icon.

9. The non-transitory computer-readable storage medium of claim 7, wherein the second plurality of icons is displayed above the first icon and the fourth plurality of icons is displayed below the first icon.

10. The non-transitory computer-readable storage medium of claim 1, wherein the second axis intersects each of the second plurality of icons and the first icon, but the second axis is not centered on the given icon, and the second axis is not displayed on the screen.

11. The non-transitory computer-readable storage medium of claim 1, wherein the icons of the first plurality of icons are organized according to an order in which the corresponding computer-generated animation concepts are used in the creation of a computer-generated animation title.

12. A system for automated training in computer-generated animation, the system comprising:
a display screen operatively coupled with one or more processors, the one or more processors configured to:
display, on the display screen, a first plurality of icons arranged about a first axis, the first plurality of icons corresponding to a plurality of computer-generated animation concepts;
receive first data representing a user selection of a first icon of the first plurality of icons, the first icon corresponding to a first computer-generated animation concept of the plurality of computer-generated animation concepts,
in response to the received first data, display, on the screen, a tutorial module teaching the first computer-generated animation concept;
display, on the display screen, a second plurality of icons arranged about a second axis,
wherein the second axis intersects the first axis at the first icon of the first plurality of icons,
wherein the second plurality of icons corresponds to a plurality of videos that illustrate the computer-generated animation concept corresponding to the first icon, and
wherein the plurality of videos comprises portions from a plurality of computer-generated animation titles, and
wherein each icon of the second plurality of icons corresponds to a different computer-generated animation title of the plurality of computer-generated animation titles; and
receive second data representing a user selection of a second icon of the second plurality of icons, and in response to the received second data, display on the screen a video of the plurality of videos, the video corresponding to the first computer-generated animation concept.

13. The system of claim 12, the one or more processors further configured to:
display, on the screen, a third plurality of icons arranged about a third axis,
wherein the third axis intersects the first axis at a third icon of the first plurality of icons, and wherein the third plurality of icons corresponds to a plurality of videos that illustrate the computer-generated animation concept corresponding to the third icon.

14. The system of claim 13, wherein:
when an icon of the second plurality of icons is aligned on a horizontal axis with an icon of the third plurality of icons, then both icons are associated with portions from the same computer-generated animation title.

15. The system of claim 14, further comprising:
an input device configured to receive third data representing user selection of the first icon, and
wherein the one or more processors are further configured to:
when the third data is received, display an instructor-narrated video that teaches a corresponding computer-generated animation concept.

16. The system of claim 15, wherein the first axis and the second axis are orthogonal.

17. The system of claim 16, wherein the first axis is horizontal and the second axis is vertical.

18. The system of claim 14, the one or more processors further configured to:
display, on the screen, a fourth plurality of icons arranged about the second axis,
wherein the first axis separates the second plurality of icons and the fourth plurality of icons, and
wherein the fourth plurality of icons corresponds to a plurality of instructor-narrated videos that teach the computer-generated animation concept corresponding to the first icon.

19. The system of claim 18, wherein:
each icon in the fourth plurality of icons comprises an instructor-narrated video that teaches an aspect of the computer-generated animation concept corresponding to the first icon.

20. The system of claim 18, wherein the second plurality of icons is displayed above the first icon and the fourth plurality of icons is displayed below the first icon.

21. The system of claim 12, wherein the second axis intersects each of the second plurality of icons and the given icon, but the second axis is not centered on the first icon, and the second axis is not displayed on the screen.

22. The system of claim 12, wherein the icons of the first plurality of icons are organized according to an order in which the corresponding computer-generated animation concepts are used in the creation of a computer-generated animation title.

23. A computer-enabled method for automated training in computer-generated animation, the method comprising:
displaying, on a screen, a first plurality of icons arranged about a first axis, the first plurality of icons corresponding to a plurality of computer-generated animation concepts;
receiving first data representing a user selection of a first icon of the first plurality of icons, the first icon corresponding to a first computer-generated animation concept of the plurality of computer-generated animation concepts, and in response to the received first data, displaying on the screen a tutorial teaching the first computer-generated animation concept;
displaying, on the screen, a second plurality of icons arranged about a second axis,
wherein the second axis intersects the first axis at a first icon of the first plurality of icons, wherein the second plurality of icons corresponds to a plurality of videos that illustrate the computer-generated animation concept corresponding to the first icon, and wherein the plurality of videos comprises portions from a plurality of computer-generated animation titles, and wherein each icon of the second plurality of icons corresponds to a different computer-generated animation title of the plurality of computer-generated animation titles; and receiving second data representing a user selection of a second icon of the second plurality of icons, and in response to the received second data, displaying on the screen a video of the plurality of videos, the video corresponding to the first computer-generated animation concept.

24. The method of claim 23, further comprising:

displaying, on the screen, a third plurality of icons arranged about a third axis, wherein the third axis intersects the first axis at a third icon of the first plurality of icons, and wherein the third plurality of icons corresponds to a plurality of videos that illustrate the computer-generated animation concept corresponding to the third icon.

25. The method of claim 24, wherein:

when an icon of the second plurality of icons is aligned on a horizontal axis with an icon of the third plurality of icons, then both icons are associated with portions from the same computer-generated animation title.

26. The method of claim 25, further comprising:

receiving third data representing user selection of the first icon;

in response to the received third data, displaying an instructor-narrated video that teaches a corresponding computer-generated animation concept.

27. The method of claim 26 wherein the first axis and the second axis are orthogonal.

28. The method of claim 27, wherein the first axis is horizontal and the second axis is vertical.

29. The method of claim 25, further comprising:

displaying, on the screen, a fourth plurality of icons arranged about the second axis, wherein the first axis separates the second plurality of icons and the fourth plurality of icons, wherein the fourth plurality of icons corresponds to a plurality of instructor-narrated videos that teach the computer-generated animation concept corresponding to the first icon.

30. The method of claim 29, wherein:

each icon in the fourth plurality of icons comprises an instructor-narrated video that teaches an aspect of the computer-generated animation concept corresponding to the first icon.

31. The method of claim 29, wherein the second plurality of icons is displayed above the first icon and the fourth plurality of icons is displayed below the first icon.

32. The method of claim 23, wherein the second axis intersects each of the second plurality of icons and the first icon, but the second axis is not centered on the first icon, and the second axis is not displayed on the screen.

33. The method of claim 23, wherein the icons of the first plurality of icons are organized according to an order in which the corresponding computer-generated animation concepts are used in the creation of a computer-generated animation title.

* * * * *